United States Patent [19]
Eaton

[11] 3,870,332
[45] Mar. 11, 1975

[54] COUPLING IMPROVEMENTS

[76] Inventor: Edward M. Eaton, 1253 E. Adele St., Anaheim, Calif. 92805

[22] Filed: Sept. 18, 1973

[21] Appl. No.: 398,440

[52] U.S. Cl............... 285/35, 285/419, 285/37.3, 285/322
[51] Int. Cl............................................. F16l 37/10
[58] Field of Search....... 285/34, 35, 243, 322, 373, 285/419

[56] References Cited
UNITED STATES PATENTS

| | | | |
|---|---|---|---|
| 2,259,137 | 10/1941 | Iftiger | 285/35 |
| 2,327,714 | 8/1943 | Iftiger | 285/35 |
| 2,463,179 | 3/1949 | Iftiger | 285/34 |
| 3,390,898 | 7/1968 | Sumida | 285/110 X |

Primary Examiner—Geo. V. Larkin
Attorney, Agent, or Firm—Robert E. Strauss

[57] ABSTRACT

There is disclosed a coupling for tubular members such as conduits, hoses and the like which provides for the rapid connecting and disconnecting of the members. The coupling comprises a body with a through opening and bearing attachment means at one end and an annular groove at the other end with a plurality of segmented and arcuate jaws having an inboard flange seated in the annular groove to provide a radially pivotal support of the jaws on the body. The outboard ends of the jaws bear tubular member gripping means while their outer peripheral surfaces have a curvilinear concave cam guide surface which is engaged by the inner surface of a cam ring that surrounds the assembly. The cam ring has a curvilinear convex inner surface. Pin and helical groove means are provided on the engaging surfaces of the cam ring and the outer cam guide surfaces of the jaws to impart rotational and axial movement to the cam ring whereby it can be moved between a coupling closed position where the jaws are urged into a radially compressed position and a coupling open position where the jaws are urged into a radially expanded position. The coupling has a minimum of parts and has no resilient or flexible members, thereby insuring long life and freedom from maintenance.

9 Claims, 5 Drawing Figures

PATENTED MAR 11 1975 3,870,332

COUPLING IMPROVEMENTS

BACKGROUND OF THE INVENTION

This invention relates to a coupling for tubular members, e.g., hoses, conduits and the like, and, in particular, relates to a coupling adapted for rapid connecting and disconnecting of such members.

There is a need for a simple coupling means for tubular members such as conduits, hoses and the like which can be used for rapid connecting and disconnecting of these members. One application which requires such coupling means are fire hoses where speed of assembly is extremely important. Although many different coupling means have been proposed, none have, as yet, been found sufficiently reliable and strong for acceptance in fire fighting service by the various regulatory agencies.

To be acceptable, the coupling means must be mechanically simple and free of any significant amount of repair and maintenance. The coupling should be readily locked in the assembled position and should resist any accidental dislodgement. The coupling should join the members in a pressure-tight seal capable of withstanding high pressures, e.g., pressures up to about 600 to 1000 psig.

Couplings which have been suggested have employed a spider bearing resilient jaw segments which are biased into an open position on the coupling and which are urged into a closed position by a cam in the form of a sliding sleeve. Examples of these are shown in U.S. Pat. Nos. 3,394,950 and 3,168,333. While these are suitable for use in low pressure applications, the spider and resilient jaw construction is not suited for high pressure service such as encountered with fire hoses and the like.

More massive segmented jaws have also been used and U.S. Pat. No. 2,327,714 discloses a construction wherein the jaws are forced open by the entry of the male coupling member of the joining member. Springs are mounted on the coupling to urge the jaw members closed. This coupling only partially facilitates the rapid assembly and does not provide for rapid dissassembly since the jaws can not be forced into and retained in an open position. The use of springs also introduces a potential weakness in the coupling and a more reliable and maintenance-free coupling would be prepared if springs were not used. Finally, many of the proposed couplings employ an axially sliding cam sleeve or ring and these are prone to disconnect since pulls or tugs on the tubular members could move the coupling into contact with a surface obstruction, e.g., a curb, that could restrain the cam sleeve during movement of the members, thereby unlocking the coupling.

It is, therefore, an object of this invention to provide a coupling useful for rapid connecting and disconnecting of tubular members.

It is a further object to provide such a coupling which will be useful for high pressure applications.

It is also an object to provide a coupling of reliable performance having a minimum of parts and free of resilient, flexing components.

It is also an object to provide a coupling having positive actuation into and retention in both the open and closed positions.

Other and related objects will be apparent from the description of the invention herein.

BRIEF STATEMENT OF THE INVENTION

This invention comprises a coupling for tubular members including conduits, hoses and the like. The coupling is formed of a body member with a through opening and bearing attachment means such as threads or flange means at one end thereof to permit its removable, fixed attachment to one of a pair of tubular members. The other end of the body member bears a plurality of segmented jaw memmbers that are pivotally mounted thereon for a limited rocking motion with radially inwardly directed tubular member engaging means at their outboard ends. The outer, longitudinal surface of each jaw member bears a curvilinear cam guide surface having raised portions at opposite ends thereof. Slidably and rotationally mounted over the jaw members is a cam ring with pin and helical groove means borne by the jaw members and cam ring to impart rotational and axial moveability to the cam ring between coupling open and coupling close positions. The cam ring has an internal cam surface which is preferably convex to engage with the outboard end of the curvilinear guide surfaces of the jaws and urge them into a radially compressed position and to engage with the inboard end of the curvilinear guide surfaces of the jaws and urge them into a radially expanded position when it is in the closed and open positions, respectively.

BRIEF DESCRIPTION OF THE DRAWINGS

The invention will be described by reference to the illustrations of a preferred embodiment, of which.

DESCRIPTION OF PREFERRED EMBODIMENTS

Figure 1:
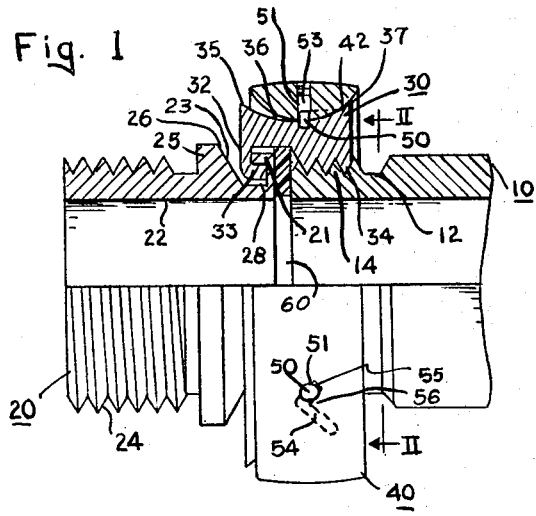
FIG. 1 is a quarter sectional elevation of the coupling in its closed position.

The coupling is shown for interconnecting tubular members such as 10 which bear ends such as 12 with attachment means such as male threads 14 that are cooperative with female threads on the other tubular member, not shown. The coupling will be most widely applicable to the joining of tubular members bearing threaded joints and is, therefore, so illustrated. Flanged joints could also be used in lieu of the threaded joints. The coupling will also be most widely used with flexible conduits such as hoses, in which applications the end 12 comprises a threaded metal fitting that is carried by the end of a hose. A bowl and expansion sleeve assembly can be used for a permanent attachment.

The coupling body 20 has a through opening 22 and bears means for its removable, fixed attachment to one of the tubular members. This is shown as male threads 24 at one end of the body. The opposite end of the body bears an annular groove 26, forming annular shoulder 25. Preferably, the outboard end of this groove is undercut at 28 to provide annular lip 21 dependent from the outboard edge of the groove. Also, in the preferred embodiment, the inboard edge of groove 26 is chamfered at 23.

Figure 2:
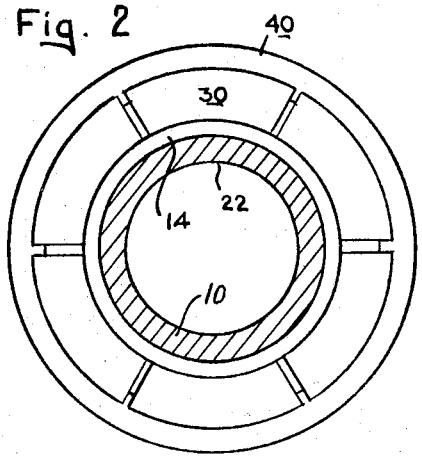
FIG. 2 is a view along lines II—II illustrating the end face of the coupling of FIG. 1.
Figure 3:
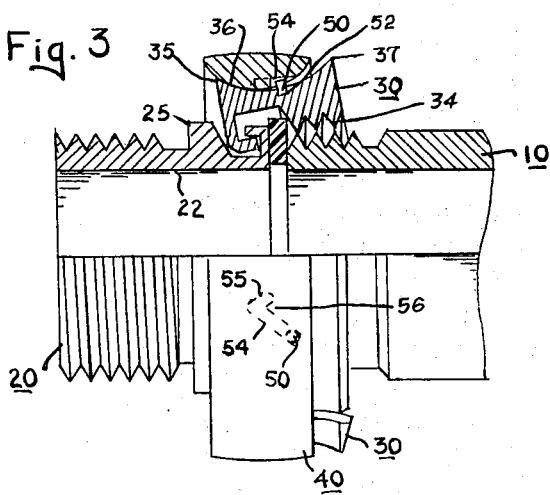
FIG. 3 is a quarter sectional elevation of the coupling in its open position.

A plurality of segmented and arcuate jaws are carried by body 20. These are shown as 30 in FIG. 2 with the upper jaw in sectional view in FIG. 1. The inboard, inside edge of each jaw bears a radial flange 32 which projects into groove 26. Preferably, an arcuate lip 33 is carried by the lower edge of each flange 32 and these lips project into the undercut 28 in the outboard end of groove 26 to provide, in combination with lip 21, axially restraining means for jaws 30. The groove 26 and mating flanges 32 of the jaws which seat therein provide connection means between body 20 and jaws 30 which permit the rocking movement of jaws 30 in a radial direction between the radially compressed position shown in FIG. 1 and the radially expanded position shown in FIG. 3.

The outboard ends of jaws 30 bear tubular member engaging means which, in the preferred embodiment, comprise female threads 34 on the inside surfaces of the jaws. The outside surfaces 36 of the jaws are formed with a concave, curvilinear cam surface having high points 35 and 37 at its opposite edges. The curvilinear cam surface can be arcuate in cross section, as shown, or can be elliptical, or of any similar curvilinear shape.

Cam ring 40 surrounds the assembly of jaws 30. This cam ring has a convex curvilinear inside surface 42 which engages with the concave curvilinear cam surfaces 36 of jaws 30. In the preferred embodiment, the surface 42 has a slightly greater convexity than the curvature of concave surface 36. Cam ring surface 42 is effective, when in the coupling closed position shown in FIG. 1 to urge jaws 30 into a radially compressed position where they are operative to engage the threaded male end 12. When the cam ring 40 is moved to its opposite position shown in FIG. 3, it is effective to urge jaws 30 into the radially expanded position.

Figure 5:
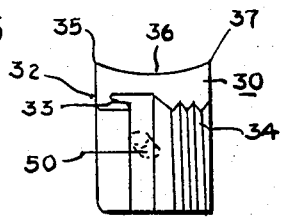
FIG. 5 is a view of one of the segmented, arcuate jaws.
Figure 4:
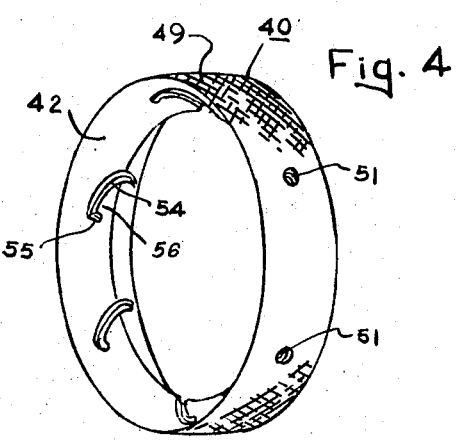
FIG. 4 is a view of the cam ring.

Cooperative means are provided on jaws 30 and ring 40 to constrain free movement of ring 40. This means comprises pin and helical groove means carried by these components, which are illustrated in FIGS. 4 and 5. As illustrated, each jaw 30 bears an upstanding pin 50 which is press fitted into a bore at a central location on its surface. To facilitate assembly, pins 50 can be placed in jaws 30 after assembly of the ring 40 and jaws 30 onto body 20. Accordingly, ring 40 bears radial bores 51 through which pins 50 are passed and seated into bores 52. Bores 51 can be tapped, and following insertion of pins 50, the bores 51 can be closed with set screws 53. The inside surface 42 of cam ring 40 bears helical grooves 54 that are spaced opposite each of pins 50. The helical grooves are shown in FIG. 4. A pin 50 projects into each groove and thereby provides means to restrain movement of ring 40 in rotational and axial directions.

If desired, detent means to restrain the cam ring 40 in the locked position can also be provided. Such detent means can be in the form of a short leg 55 at the leading end of the helical grooves 54. The position as well as the shape of leg 55 as well as the shape of grooves 54 can be seen in broken lines in FIGS. 1 and 3. As shown in FIG. 1, the leg 55 is transverse to groove 54 while in the embodiment shown in FIG. 3, the leg 55 is at an acute angle to the end of groove 54 to provide a rounded shoulder 56 that will serve to lock the ring 40 in the closed position.

The coupling bears compressible seal means in the form of resilient washer 60 that is formed of conventional material such as natural or synethic rubber, felt, cork, etc. The axial compression of the end of tubular member 10 against the outboard end of body 20 will compress this washer 60 tightly to provide a pressure resistant joint.

The outside surface of the cam ring 40 can bear gripping means whereby it can be rotated on the assembly. This can simply be a knurled surface as shown at 49 or can be conventional wrench flats or lugs machined or cast in the ring.

The use of the coupling is fairly apparent from the preceding description. When the coupling is to be used to secure two tubular members, body 20 is threaded onto the tubular member bearing the female threads. Cam ring 40 is rotated to move it into the coupling open position shown in FIG. 3 and the male-threaded end of the mating tubular member 10 is inserted to butt against compressible seal means 60. The ring 40 is then rotated to advance it into the position shown in FIG. 1. The direction of the helical grooves 52 in ring 40 should be in the same direction as the direction of threads of the tubular members, e.g., when right-hand threads are carried by the tubular members 10, the direction of the helical grooves 54 whould also be right-handed. This permits the continued rotation of cam ring 40 after it reaches the coupling closed position. The continued rotation of the ring will also rotate the jaws 30 about body 20 and permit tightening of the joint of the tubular members to insure that the joint is entirely pressure resistant.

The metal elements of the coupling of this invention can be formed of suitable corrosion resistant metals. Examples of suitable metals include: stainless steels, brass, bronze, surface anodized and hardened aluminum, etc.

The invention has been described with reference to the presently preferred and illustrated embodiment thereof. It is not intended that the invention be unduly limited to the illustrated and preferred embodiment. Instead, it is intended that the invention be defined by the means and elements and their obvious equivalents set forth in the following claims.

What is claimed is:

1. A coupling for interconnecting a pair of tubular members and the like which comprises:
   a. a body having a through opening and bearing attachment means at one end thereof permitting its removable, fixed attachment to one of said pair of tubular members and annular groove means at the opposite end thereof;
   b. a plurality of closely spaced, segmented arcuate jaws carried at said opposite end, each jaw bearing an inboard radial flange cooperative with said annular groove of said body to provide a connection of said jaws on said body permitting the pivotal movement of said jaws in a radial direction between radially expanded and radially compressed positions;
   c. tubular member engaging means carried on the outboard end of each of said jaws and mutually cooperative to engage the mating end of the other of said pair of tubular members when in the radially compressed position;
   d. a curvilinear concave cam guide surface on the outside of each of said segmented, arcuate jaws; a cam ring surrounding the assembly of said jaws on said body and having a curvilinear, concave inner surface in engagement with the cam guide surfaces of said jaws; and e. pin means carried on each of said jaws and cooperative helical groove means carried on engaging surfaces of said cam ring whereby rotation of said ring imparts axial movement thereto between a coupling closed position wherein said cam ring engages said jaws to urge said jaws into said radially compressed position and a coupling open position wherein said cam ring engages the inboard edges of said jaws to urge said jaws into said radially expanded position.

2. The coupling of claim 1 wherein compressible seal means is engaged between the outboard end of said body and the mating end of the tubular member engaged by said jaws.

3. The coupling of claim 2 wherein the outboard edge of said annular groove bears annular lip means and said annular flange bears mating annular lip means to provide axially restraining means for said jaws.

4. The coupling of claim 3 wherein the radial surface of the annular groove means facing said opposite end is chamfered.

5. The coupling of claim 1 wherein said attachment means comprises a threaded end portion of said body.

6. The coupling of claim 5 wherein said threaded end portion of said body comprises male threads.

7. The coupling of claim 1 wherein a total of six jaws are closely spaced about said body.

8. The coupling of claim 1 wherein the outer surface of said cam ring bears gripping means.

9. The coupling of claim 1 wherein the outside surface of said cam ring is knurled.

* * * * *